(12) United States Patent
Suzuki et al.

(10) Patent No.: US 7,520,835 B2
(45) Date of Patent: Apr. 21, 2009

(54) FLUID CIRCUIT MODULE AND AUTOMATIC TRANSMISSION

(75) Inventors: Fuminori Suzuki, Okazaki (JP); Hitoshi Tanaka, Nagoya (JP)

(73) Assignee: Denso Corporation, Kariya (JP)

( * ) Notice: Subject to any disclaimer, the term of this patent is extended or adjusted under 35 U.S.C. 154(b) by 662 days.

(21) Appl. No.: 11/213,897

(22) Filed: Aug. 30, 2005

(65) Prior Publication Data

US 2006/0049084 A1  Mar. 9, 2006

(30) Foreign Application Priority Data

Sep. 8, 2004 (JP) .............................. 2004-261484

(51) Int. Cl.
*B60W 10/00* (2006.01)
(52) U.S. Cl. ...................... 477/34; 73/114.01; 73/760; 73/847; 137/557; 192/107 R
(58) Field of Classification Search ................... 477/34, 477/39, 52, 70, 86, 90, 97, 53; 192/107 R, 192/107 C; 73/847, 862.12, 114.01, 760; 74/867, 869; 137/557
See application file for complete search history.

(56) References Cited

U.S. PATENT DOCUMENTS

| 4,598,612 | A | * | 7/1986 | Ideta ........................... 477/53 |
| 5,678,675 | A | * | 10/1997 | Dover et al. ............ 192/107 R |
| 6,308,725 | B1 | | 10/2001 | Lawlyes et al. |
| 2006/0240941 | A1 | * | 10/2006 | Martin ........................ 477/34 |

* cited by examiner

*Primary Examiner*—Joseph W Drodge
(74) *Attorney, Agent, or Firm*—Nixon & Vanderhye PC

(57) ABSTRACT

A fluid circuit module controls a fluid to be supplied to a movable element in an automatic transmission. The fluid circuit module is provided with a first body in which a first flow passage is formed, a second body in which a second flow passage is formed. A separation plate is set between the first body and the second body and has a deformation portion that is deformed and strained in accordance with the difference between pressures in the first flow passage and the second flow passage. A strain sensor is attached to the deformation portion for detecting a strain of the deformation portion. A control means controls a supply fluid to be supplied to the movable element on the basis of a detection result of the strain sensor.

26 Claims, 15 Drawing Sheets

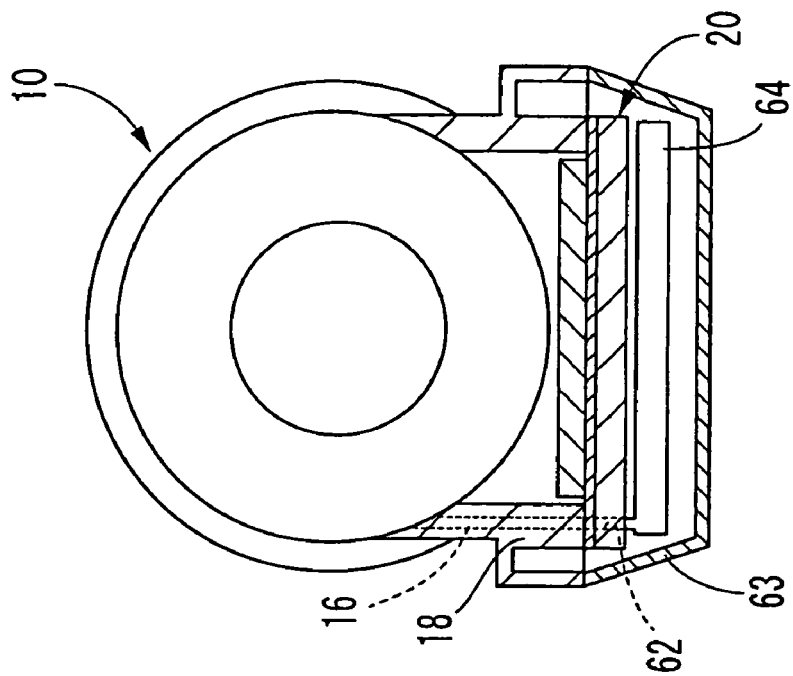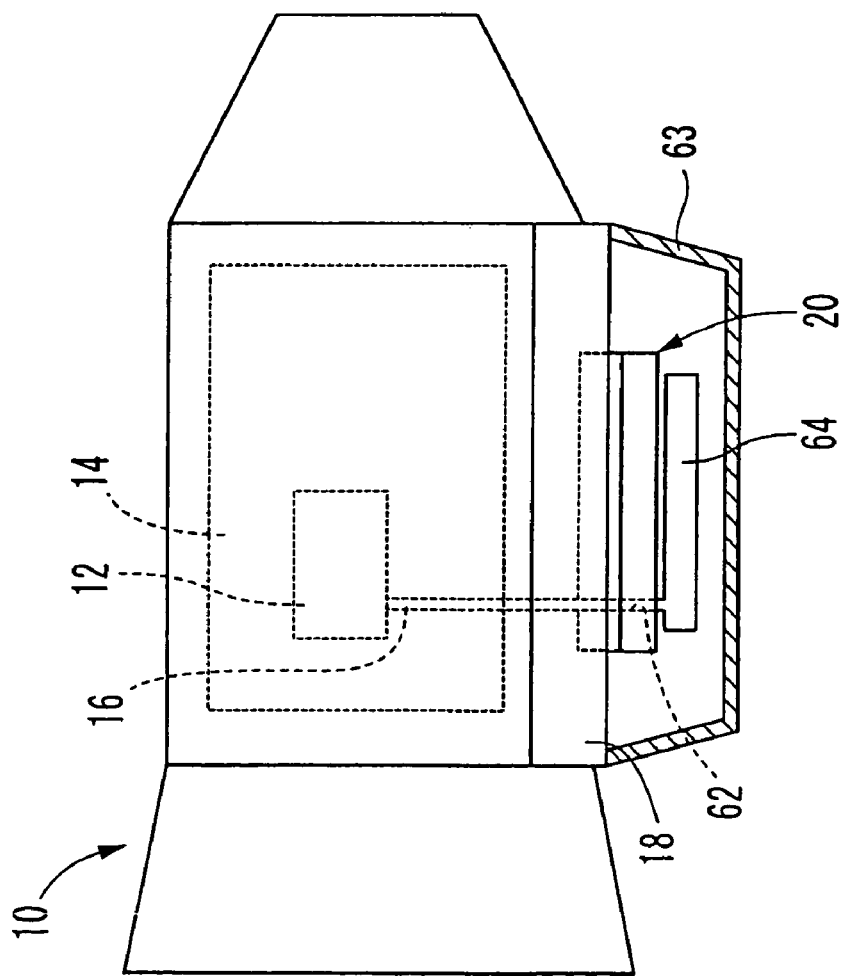

FLUID CIRCUIT MODULE AND AUTOMATIC TRANSMISSION

CROSS-REFERENCE TO RELATED APPLICATION

This application is based on Japanese Patent Application No. 2004-261484 filed on Sep. 8, 2004, the disclosure of which is incorporated herein by reference.

FIELD OF THE INVENTION

The present invention relates to a fluid circuit module and an automatic transmission having it.

BACKGROUND OF THE INVENTION

Automatic transmissions are known in which a movable element is driven in accordance with the pressure of a fluid supplied to the movable element and the transmission gear ratio is thereby changed, as exemplified by stepped transmissions in which a friction element as a movable element is engaged or disengaged in accordance with the pressure of a fluid supplied to the movable element and the transmission gear ratio is thereby changed stepwise.

To control a fluid to be supplied to the movable element, automatic transmissions employ a fluid circuit module as disclosed in U.S. Pat. No. 6,308,725, for example. Usually, in fluid circuit module products, a pressure regulating valve means for adjusting the pressure of a fluid to be supplied to the movable element and a pressure sensor for detecting the pressure of, for example, the fluid to be supplied to the movable element are incorporated in a body that forms a flow passage. In such fluid circuit modules, the operation of the pressure regulating valve means is controlled on the basis of a detection result of the pressure sensor and a fluid to be supplied to the movable element is thereby controlled.

However, in fluid circuit modules used for automatic transmissions, the pressure of a fluid to be handled is high and the pressure sensor is necessarily large. Therefore, the pressure sensor projects outward from the body, as a result of which not only the size of the fluid circuit module but also the size of the automatic transmission is large. In addition, to detect a pressure difference between plural flow passages and flow rates of the respective flow passages, plural such large-size pressure sensors need to be provided. In this case, the sizes of the fluid circuit module and the automatic transmission are further increased.

SUMMARY OF THE INVENTION

An object of the present invention is to provide a small-size fluid circuit module and automatic transmission.

In a flow circuit module according to the invention, a deformation portion of a separation plate that is set between a first body and a second body is deformed (stressed) in accordance with the difference between pressures in a first flow passage and a second flow passage formed in the first body and in the second body, respectively.

The detection result of a strain sensor for detecting a strain of the deformation portion also varies in accordance with the difference between the pressures in the first flow passage and the second flow passage. Therefore, control means can control a fluid to be supplied to a movable element by performing a control on the basis of the detection result of the strain sensor. Further, since a detection result necessary for controlling a supply fluid can be obtained merely by attaching at least one strain sensor to the deformation portion, the size of the fluid circuit module can be reduced.

BRIEF DESCRIPTION OF THE DRAWINGS

FIGS. 2A and 2B are a partially sectional front view and a partially sectional side view, respectively, of the automatic transmission according to the first embodiment.

DETAILED DESCRIPTION OF EMBODIMENT

Figure 1:
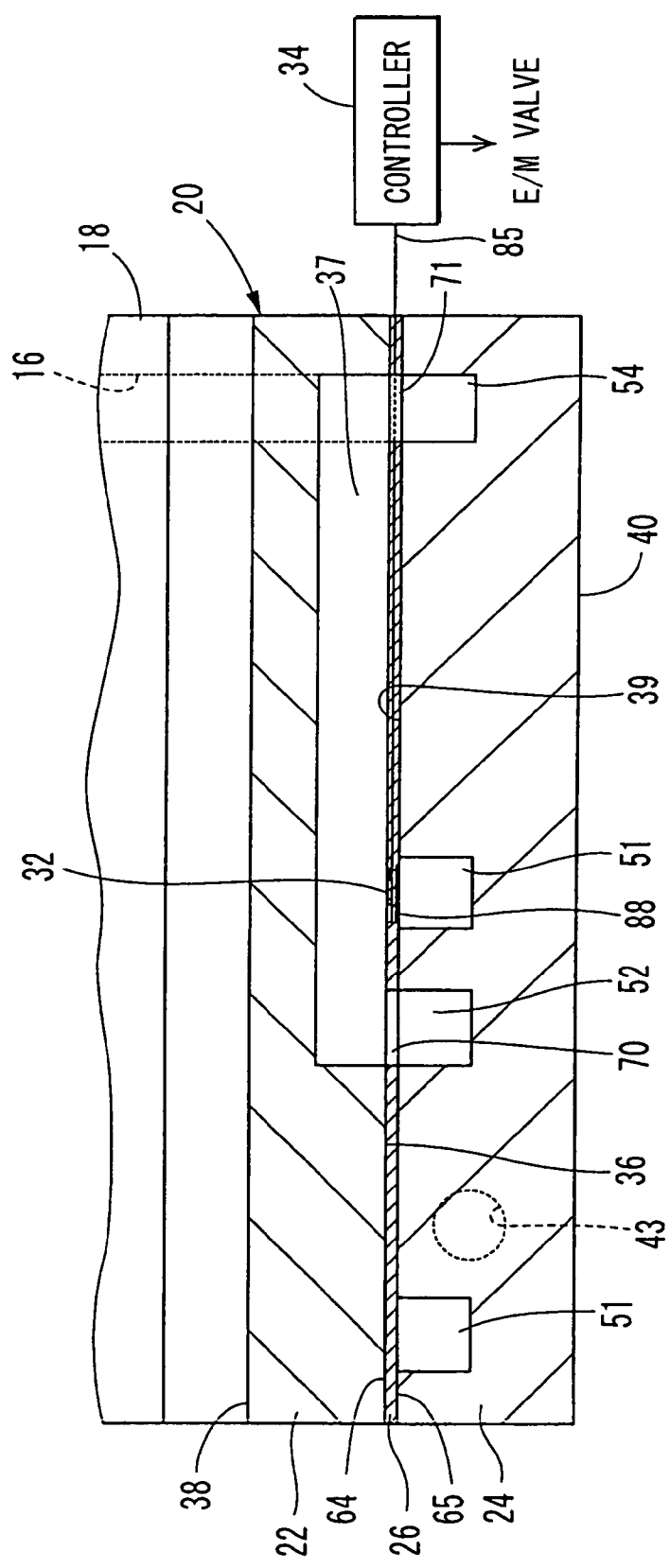
FIG. 1 is a sectional view, taken along line I-I in FIG. 3, of an automatic transmission according to a first embodiment.

Plural embodiments of the present invention will be hereinafter described with reference to the drawings.

First Embodiment

FIGS. 2A and 2B show an automatic transmission 10 according to a first embodiment of the invention. The automatic transmission 10 is equipped with a speed changing mechanism 14 having a movable element 12, a case 18 that houses the speed changing mechanism 14 and forms a flow passage 16, and a fluid circuit module 20 for controlling operating oil to be supplied to the movable element 12 via the flow passage 16. The movable element 12 is driven by the operating oil (hereinafter referred to as "supply oil") that is supplied from the fluid circuit module 20. With the movable element 12 driven in this manner, the speed changing mechanism 14 changes, stepwise or continuously, the transmission gear ratio of the vehicle that is mounted with the automatic transmission 10. An example of the speed changing mechanism 14 that changes the transmission gear ratio stepwise is one in which a friction element as the movable element 12 includes engaged or disengaged in accordance with the pressure of supply oil. On the other hand, examples of the speed changing mechanism 14 that changes the transmission gear ratio continuously include one in which the winding diameters of belts in pulleys as movable element 12 are changed in accordance with the pressure of supply oil and one in which a trunnion for supporting a power roller that is interposed between input and output discs is provided as the movable element 12 and the inclination angle of the power roller is changed in accordance with the pressure of supply oil.

Part of the fluid circuit module 20 that controls supply oil to be supplied to the movable element 12 will be illustrated and described below. However, actually, the fluid circuit module 20 is provided with plural components (the other ones are not shown) that are the same as the part described below in a proper number corresponding to the number of movable elements 12.

The fluid circuit module 20 is attached to the bottom portion of the case 18. As shown in FIGS. 1 and 3-5, the fluid circuit module 20 is composed of a top body 22, a bottom body 24, a separation plate 26, an electromagnetic valve 28, a pressure control valve 29, a line pressure control valve 30, a strain gauge 32, a controller 34, and the like.

The top body 22 is made of aluminum and is formed like a rectangular plate. The top body 22 is formed with a flow passage 37 that has an opening in one end surface 36 and through which operating oil flows.

The bottom body 24 is made of aluminum and is formed like a rectangular plate. The bottom body 24 has end surfaces 39 and 40 having a smaller area than the end surfaces 36 and 38 of the top body 22. The bottom body 24 is formed with holding holes 42, 43, and 44 having openings in one side surface 41. The electromagnetic valve 28 is held and positioned in the holding hole 42. A spool 45 is held in the holding hole 43 so as to be able to slide (reciprocate) in the axial direction, and the holding hole 43 and the spool 45 constitute the pressure control valve 29. A spool 46 is held in the holding hole 44 so as to be able to slide (reciprocate) in the axial direction, and the holding hole 44 and the spool 46 constitute the line pressure control valve 30.

The bottom body 24 is also formed with plural flow passages 50-54 that have openings in the end surface 39 and through which operating oil flows. The flow passage 50 connects an output portion 56 of the electromagnetic valve 28 and a first input portion 57 of the pressure control valve 29. The flow passage 51 connects a second input portion 58 of the pressure control valve 29 and an output portion 59 of the line pressure control valve 30. The flow passage 52 is connected to an output portion 60 of the pressure control valve 29. The flow passage 53 is connected to an input portion 61 of the line pressure control valve 30. The flow passage 54 is connected to the flow passage 16 via a flow passage 74 of the separation plate 26.

A flow passage 62 penetrates through the bottom body 24 so as to have openings in the end surfaces 39 and 40. As shown in FIG. 2, the flow passage 62 is connected to a strainer 64A that is accommodated in an oil pan 63 of the vehicle. The strainer 64A is provided to remove foreign substances from operating oil that is introduced from the oil pan 63 into the flow passage 62.

As shown in FIGS. 1 and 3-5, the separation plate 26 is formed like a rectangular plate and is thinner than the top body 22 and the bottom body 24. And the separation plate 26 has end surfaces 64 and 65 having the same area as the end surfaces 39 and 40 of the bottom body 24. The separation plate 26 is set between the end surface 36 of the top body 22 and the end surface 39 of the bottom body 24 in such a manner that the end surface 64 and 65 of the separation plate 26 are overlaid to the respective end surfaces 36 and 39. As a result, the opening of the flow passage 37 of the top body 22 is covered with the one end surface 64 of the separation plate 26 and the openings of the flow passages 50-54 of the bottom body 24 are covered with the other end surface 65 of the separation plate 26. A portion (fixing portion) 66 of the end surface 64 of the separator 26 that is not in contact with the top body 22 is fixed to an end surface 67 of the case 18 in such a manner that the end surfaces 64 and 67 are registered with each other. Therefore, the separation plate 26 is also set between a portion, corresponding to the fixing portion 66, of the end surface 39 of the bottom body 24 and the end surface 67 of the case 18.

Flow passages 70-75 penetrate through the separation plate 26 in the thickness direction so as to have openings in the end surfaces 64 and 65. The flow passage 70 connects the flow passage 37 of the top body 22 and the flow passage 52 of the bottom body 24. The flow passage 71 connects the flow passage 37 of the top body 22 and the flow passage 54 of the bottom body 24. The flow passages 72 and 73 are connected to the respective flow passages 62 and 53 of the bottom body 24, and are connected to the input side and the output side of an oil pump 76 that is driven by the internal combustion engine of the vehicle via the passages 77 and 78 of the case 18, respectively. The flow passage 74 connects the flow passage 54 of the bottom body 24 and the flow passage 16 of the case 18.

Figure 6:
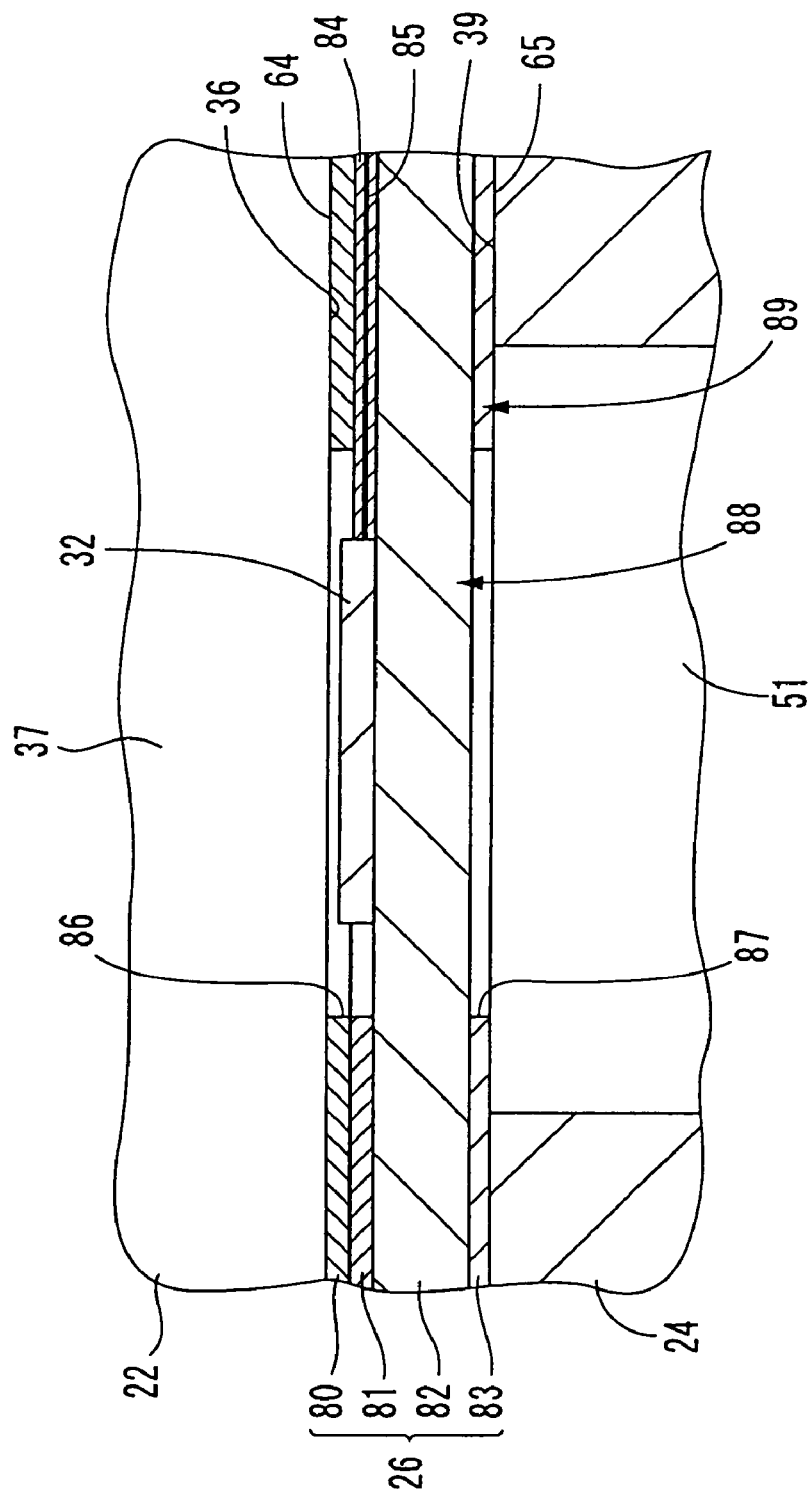
FIG. 6 is an enlarged sectional view of an important part of the fluid circuit module of the automatic transmission according to the first embodiment.

As shown in FIG. 6, the separation plate 26 of this embodiment is a combination of a top seal member 80, a wiring member 81, a base member 82, and a bottom seal member 83 that are stacked in this order. The top seal member 80 is made of paper, expanded rubber, or the like and assumes a sheet-like form. The top seal member 80 is in surface contact with the end surface 36 of the top body 22 and thereby seals the space between the top body 22 and the combination of the base member 82 and the wiring member 81. The wiring member 81 is such that a signal line 85 made of copper foil or the like is incorporated in a main body 84 that is made of polyimide or the like and assumes a film-like form. Therefore, the signal line 85 is set between the top seal member 80 and the base member 82. The bottom seal member 83 is made of paper, expanded rubber, or the like and assumes a sheet-like form. The bottom seal member 83 is in surface contact with the end surface 39 of the bottom body 24 and thereby seals the space between the base member 82 and the bottom body 24. The base member 82 is made of iron or the like and is formed like a thick sheet. As such, the base member 82 has a certain level of rigidity.

A generally circular window 86 penetrates through the top seal member 80 and the wiring member 81. A circular window 87 penetrates through the bottom seal member 83. The windows 86 and 87 are arranged in the thickness direction of the separation plate 26 so as to coextend with each other, and are located between that portions of the flow passage 37 of the top body 22 and the flow passage 51 of the bottom body 24 which are arranged in the thickness direction and cross each other approximately perpendicularly. A portion 88 of the base member 82 that is exposed through the windows 86 and 87 forms a deformation portion 88 that separates the flow passages 37 and 51 located on both sides and is deformed (strained) in accordance with the difference between pressures in the flow passages 37 and 51. A portion 89, separating the flow passages 37 and 51 located on both sides, of a lamination portion that consists of portions of the top seal member 80 and the wiring member 81 located outside the window 86, a portion of the bottom seal member 83 located outside the window 87, and a portion of the base member 82 located outside the deformation portion 88 is a thick portion 89 that is thicker than the deformation portion 88.

Figure 3:
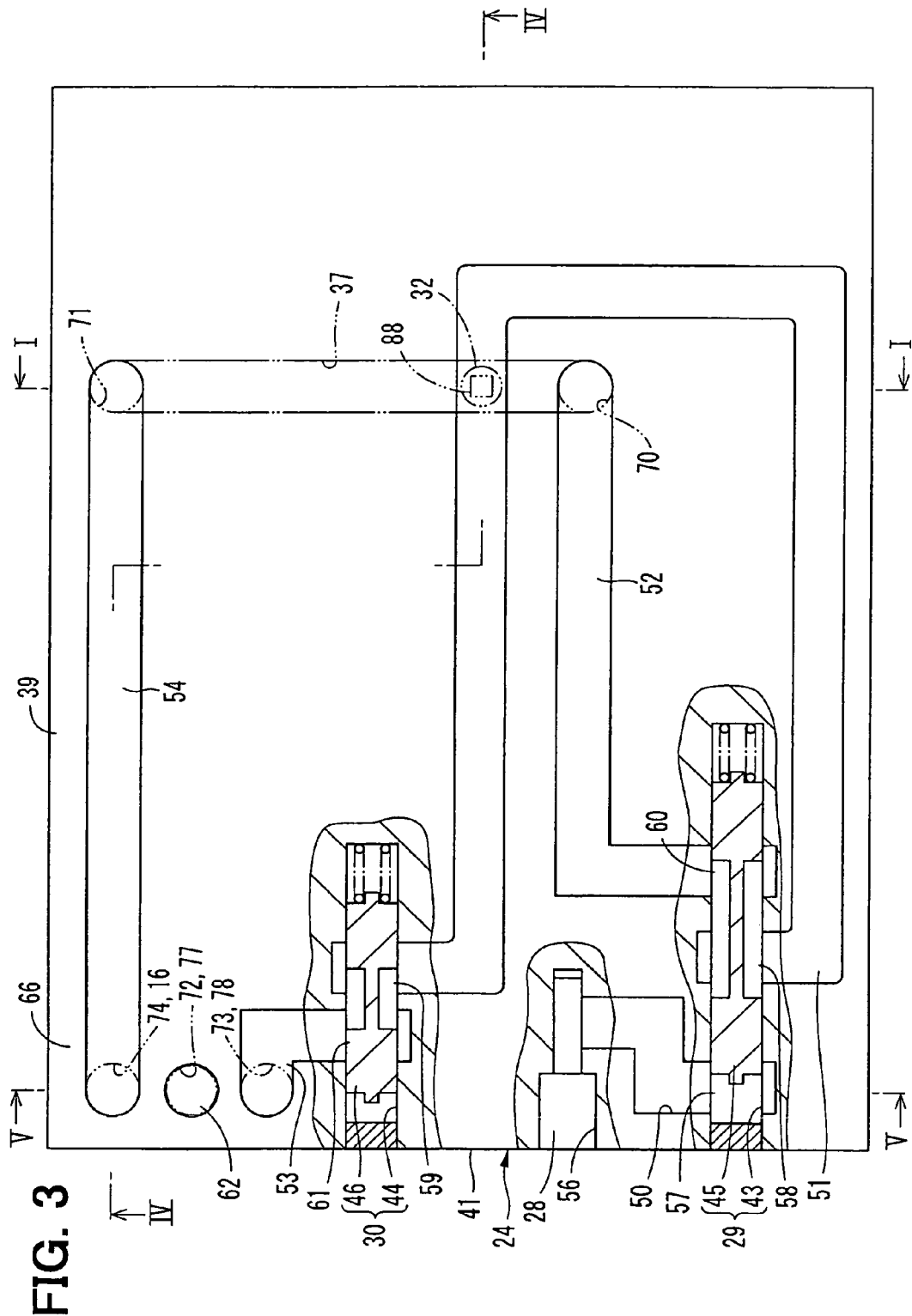
FIG. 3 is a sectional view, taken along line III-III in FIG. 4, of a fluid circuit module of the automatic transmission according to the first embodiment.
Figure 4:
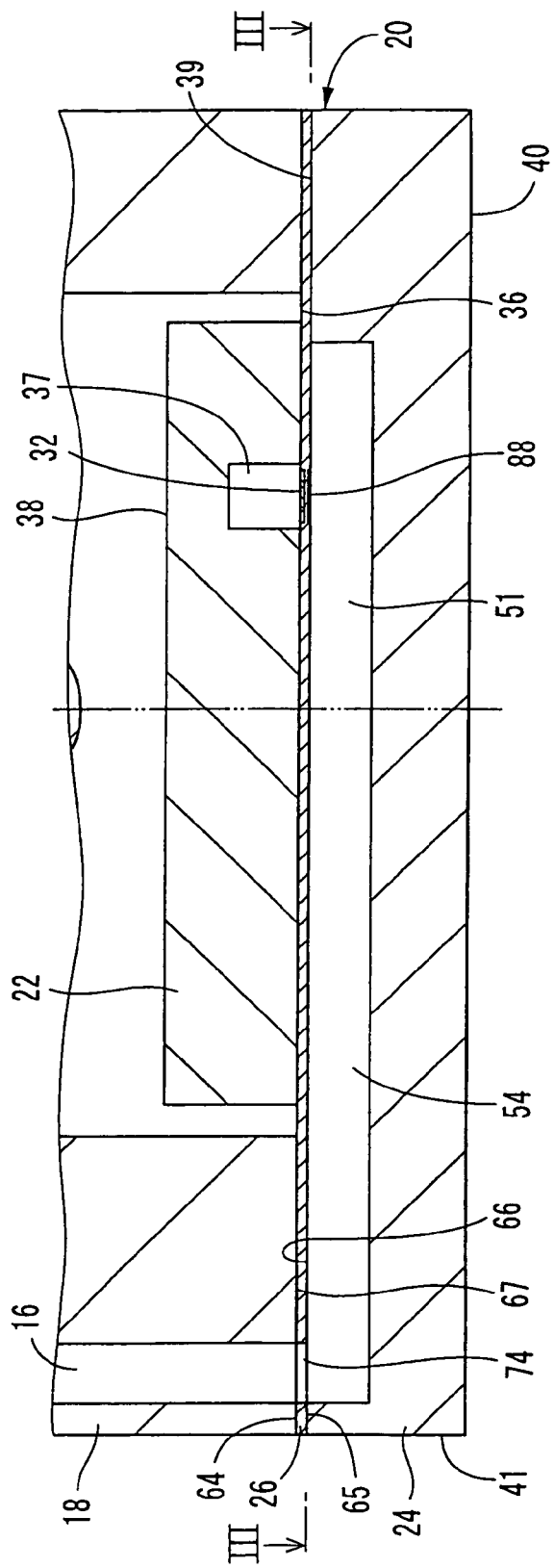
FIG. 4 is a sectional view, taken along line IV-IV in FIG. 3, of the automatic transmission according to the first embodiment.
Figure 5:
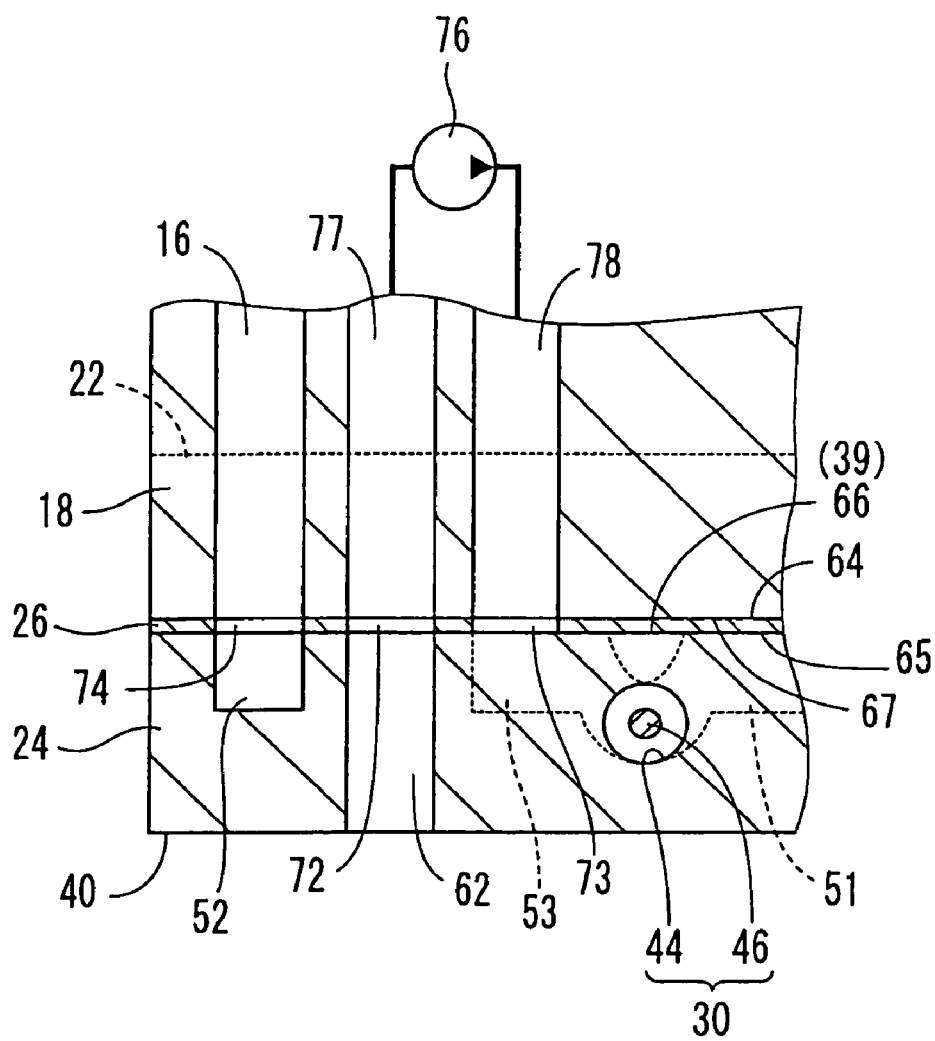
FIG. 5 is a sectional view, taken along line V-V in FIG. 3, of the automatic transmission according to the first embodiment.

As shown in FIGS. 1 and 3, the strain gauge 32 that is a rectangular piece smaller than the window 86 is attached to the flow-passage-37-side surface of the deformation portion 88 and is accommodated in the window 86. The strain gauge 32 is electrically connected to the signal line 85 of the wiring member 81. The strain gauge 32 detects a strain of the deformation portion 88 that corresponds to the difference between pressures in the flow passages 37 and 51, and outputs a signal representing the detection result via the signal line 85.

The controller 34 mainly consists of electrical circuits of a microcomputer etc. and is disposed outside the top body 22 and the bottom body 24 as schematically shown in FIG. 1. The controller 34 is electrically connected to the signal line 85 of the wiring member 81 and the electromagnetic valve 28. The controller 34 receives an output signal of the strain gauge 32 that is transmitted via the signal line 85, and controls operation of the electromagnetic valve 28 on the basis of a detection result of the strain gauge 32 represented by the output signal, that is, a strain of the deformation portion 88.

Next, the operation of the flow circuit module 20 will be described.

When the ignition switch of the vehicle is turned on and the internal combustion engine is thereby started, the operating oil in the oil pan 63 is sucked by the oil pump 76 via a strainer 64 and flow passages 62 and 72, and operating oil is discharged from the oil pump 76 to the flow passage 73 at a pressure corresponding to a rotation speed of the internal combustion engine. The operating oil that has been discharged to the flow passage 73 is supplied to the line pressure control valve 30 via the flow passage 53 and its pressure is controlled to a prescribed line pressure by the line pressure control valve 30. The operating oil of which pressure has been controlled to the line pressure is supplied to the pressure control valve 29 via the flow passage 51.

After the ignition switch has been turned on, the controller 34 gives the electromagnetic valve 28 a control instruction to change the state of the movable element 12 to a driving state corresponding to a running state of the vehicle or to keep such a driving state. In doing so, the controller 34 calculates the difference between pressures in the flow passages 37 and 51 on the basis of a strain of the deformation portion 88 that is represented by an output signal of the strain gauge 32 and changes the control instruction to the electromagnetic valve 28 in accordance with the calculation result. As a result, the control instruction from the controller 34 reflects the difference between the pressures in the flow passages 37 and 51 at the time of detection of the strain.

When receiving the control instruction from the controller 34, the electromagnetic valve 28 adjusts the pressure of operating oil to be supplied to the pressure control valve 29 to the instructed pressure conforming to the control instruction. For example, the electromagnetic valve 28 uses, as its original pressure, a modulated pressure that is obtained by adjusting the line pressure in the flow passage 51 by a modulator valve (not shown).

Supplied with the operating oil having the instructed pressure from the electromagnetic valve 28 and the operating oil having the line pressure from the line pressure control valve 30, the pressure control valve 29 controls supply oil to be supplied to the movable element 12 via the flow passages 52, 70, 37, 71, 54, 74, and 16. In doing so, the pressure control valve 29 adjusts the pressure of the supply oil to a supply pressure that conforms to the instructed pressure using the line pressure as its original pressure. Since as described above the instructed pressure conforms to the control instruction from the controller 34, the supply pressure also conforms to the control instruction from the controller 34.

In the above-described first embodiment, the bottom body 24 corresponds to the first body, the flow passage 51 corresponds to the first flow passage, the top body 22 corresponds to the second body, the flow passage 37 corresponds to the second flow passage, and the top seal member 80 and the bottom seal member 83 corresponds to the seal member respectively. Further, in the first embodiment, the strain gauge 32 corresponds to the strain sensor, the controller 34 corresponds to the control means, and the electromagnetic valve 28 and the pressure control valve 29 cooperate to constitute the pressure regulating valve means.

As described above, according to the first embodiment, since the pressure of supply oil is adjusted according to the control instruction that conforms to the difference between the supply pressure in the flow passage 37 and the line pressure in the flow passage 51, a supply oil control can be realized in such a manner as to reflect the above pressure difference satisfactorily. Since such a supply oil control on one movable element 12 can be realized merely by providing one strain gauge 32 which can be miniaturized easily, not only the size of the fluid circuit module 20 but also the size of the automatic transmission 10 can be reduced.

Further, according to the first embodiment, the thin deformation portion 88 and the thick portion 89 that circumscribes the deformation portion 88 are formed in the portion of the separation plate 26 that separates the flow passages 37 and 51 from each other. As a result, whereas the deformation portion 88 is easily strained by the difference between the pressures in the flow passages 37 and 51, the thick portion 89 is not. Therefore, the detection result of the strain gauge 32 for detecting the strain of the deformation portion 88 is superior in the resolution for the difference between the pressures in the flow passages 37 and 51. In the first embodiment, since the supply pressure that is adjusted by the pressure control valve 29 with the line pressure used as the original pressure is lower than the line pressure, the deformation portion 88 is deformed (strained) so as to bulge into the flow passage 37 having the supply pressure. Therefore, the strain gauge 32 which is attached to the flow-passage-37-side surface of the deformation portion 88 can detect the strain of the deformation portion 88 more easily, whereby increase in detection accuracy is expected. As is understood from the above description, since the controller 34 can calculate, with high accuracy, the difference between the pressures in the flow passages 37 and 51 on the basis of the detection result of the strain gauge 32, not only the operation control for the electromagnetic valve 28 based on the calculation result but also the supply oil control can be made more accurate.

Still further, according to the first embodiment, the exposed portion 88 of the base member 82 both surfaces of which are exposed through the window 86 of the top seal member 80 and the wiring member 81 and the window 87 of the bottom seal member 83 serves as the deformation portion 88 of the separation plate 26. And the lamination portion 89 consisting of the portions of the top seal member 80 and the wiring member 81 located outside the window 86, the portion of the bottom seal member 83 located outside the window 83, and the portion of the base member 82 located outside the deformation portion 88 serves as the thick portion 89 of the separation plate 26. Therefore, the deformation portion 88 and the thick portion 89 can be formed simultaneously and easily merely by laying the top seal member 80, the wiring member 81, the base member 82, and the bottom seal member 83 one on another sequentially. Furthermore, since as described above the thick portion 89 is not deformed easily, the performance of sealing between the top seal member 80 and the top body 22 and that between the bottom seal member 83 and the bottom body 24 can be kept high outside the windows 86 and 87.

In addition, according to the first embodiment, the output signal of the strain gauge 32 which is attached to the deformation portion 88 located between the top body 22 and the bottom body 24 is transmitted to the controller 34 disposed outside the bodies 22 and 24 via the signal line 85 which is set between the top seal member 80 and the base member 82.

This prevents the fluid properties of each flow passage of the top body 22 and the bottom body 24 from being varied by the presence of the signal line 85. And the sealing necessary for leading out the signal line 85 to the outside can be easily realized by its contact with the top seal member 80 and the base member 82.

Second Embodiment

Figure 7:
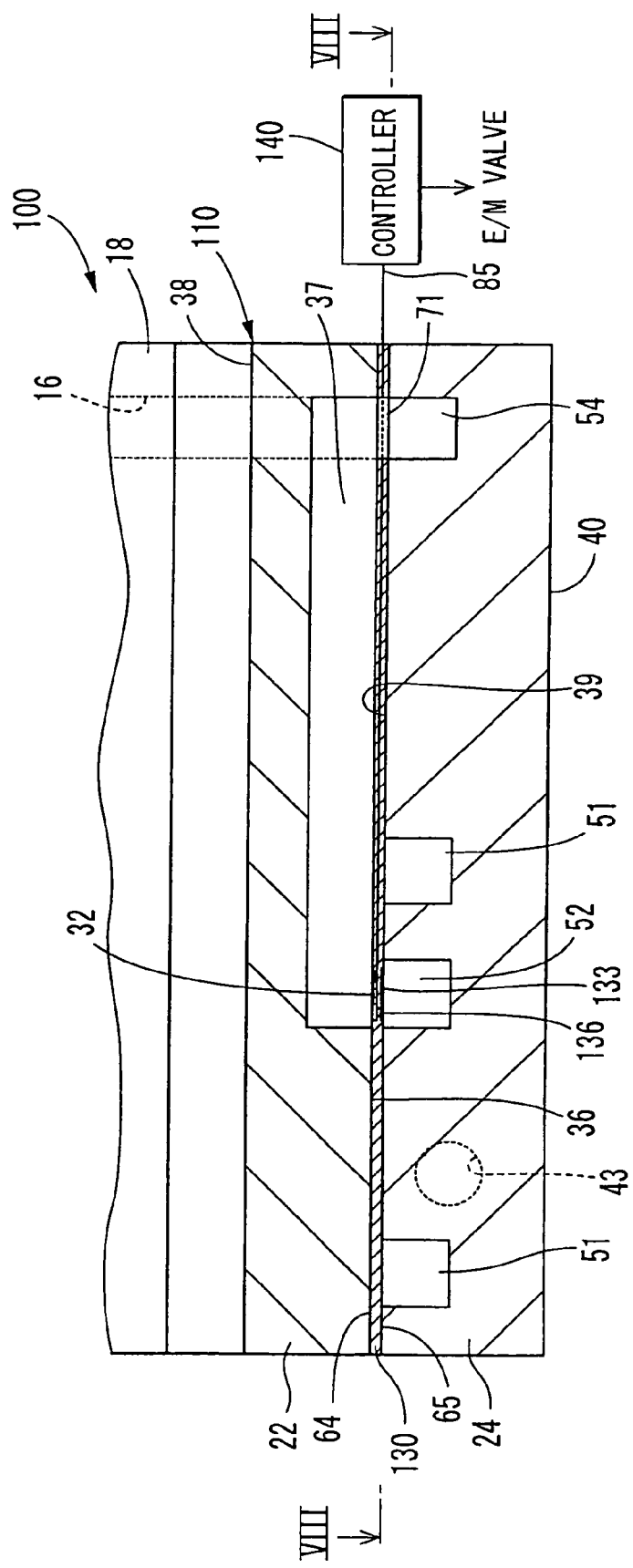
FIG. 7 is a sectional view, taken along line VII-VII in FIG. 8, of an automatic transmission according to a second embodiment.
Figure 8:
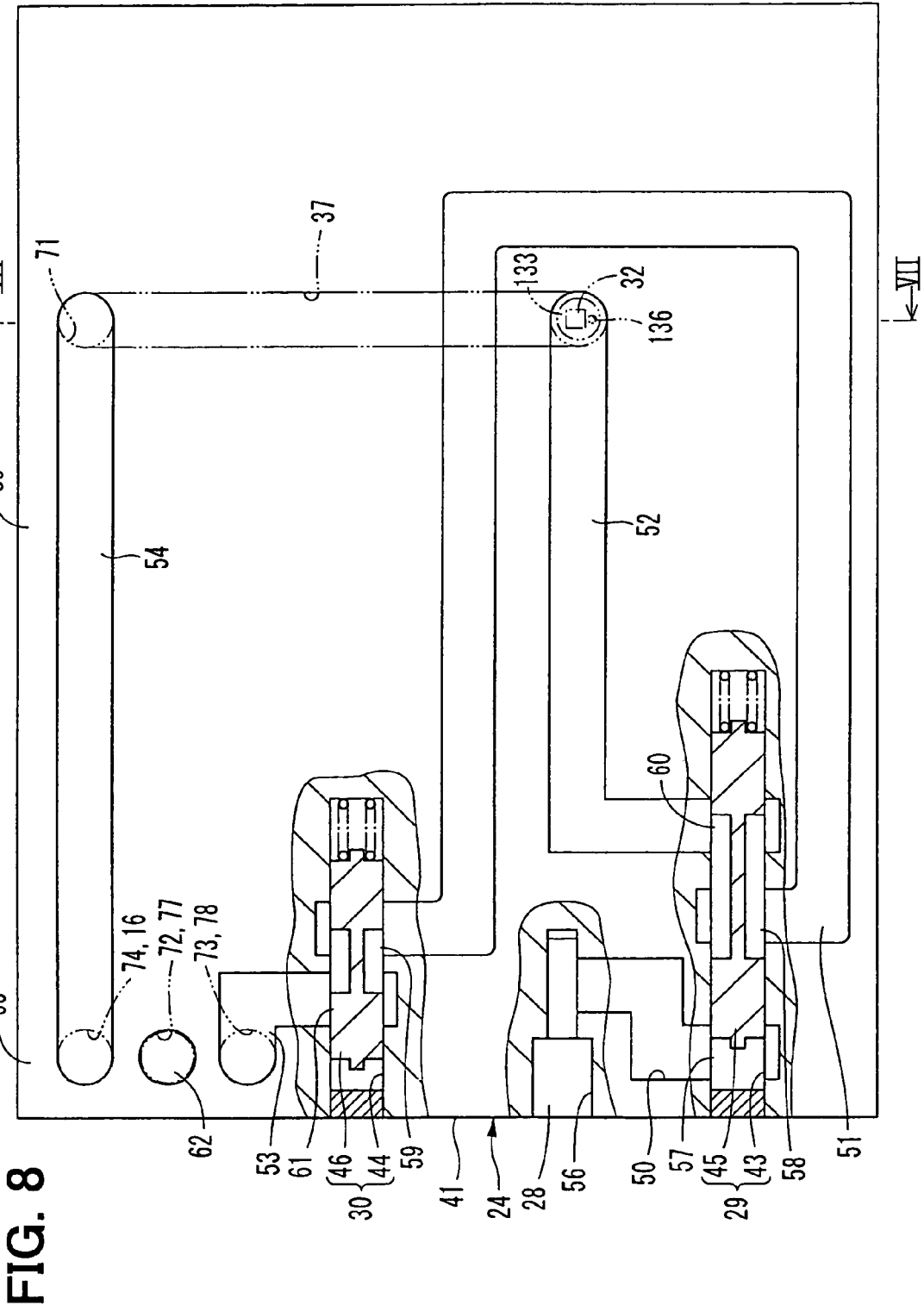
FIG. 8 is a sectional view, taken along line VIII-VIII in FIG. 7, of a fluid circuit module of the automatic transmission according to the second embodiment.
Figure 9:
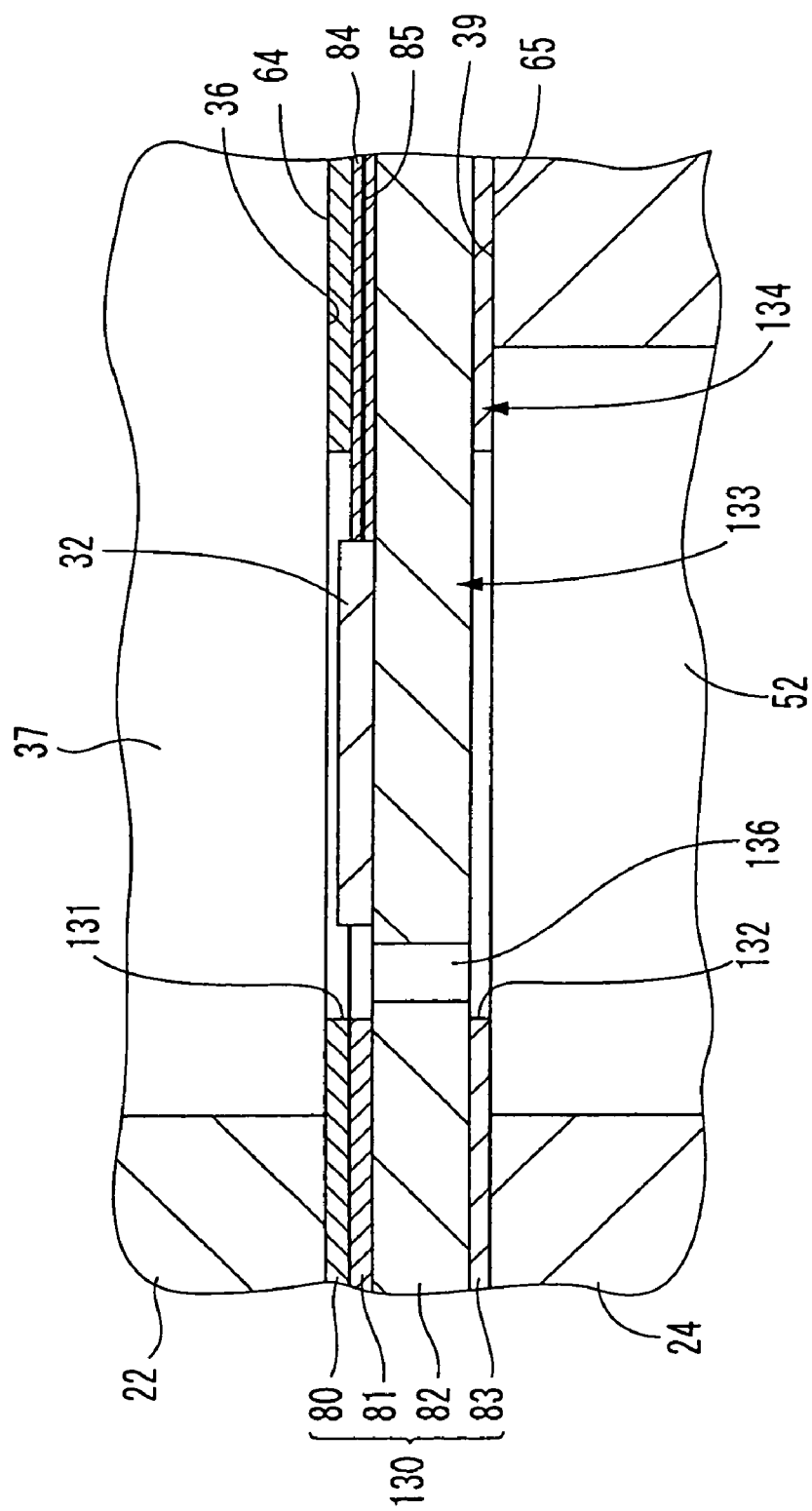
FIG. 9 is an enlarged sectional view of an important part of the fluid circuit module of the automatic transmission according to the second embodiment.

A second embodiment of the invention is a modification of the first embodiment. FIGS. 7-9 show an automatic transmission 100 according to the second embodiment. Components of the second embodiment having substantially the same components in the first embodiment will be given the same reference symbols as the latter and will not be described.

In a fluid circuit module 110 of the automatic transmission 100, a separation plate 130 is not formed with the flow passage 70 of the first embodiment and, instead, is formed with windows 131 and 132, a deformation portion 133, and a thick portion 134 having a different structure than in the first embodiment.

More specifically, the generally circular window 131 that penetrates through the top seal member 80 and the wiring member 81 is connected to the end portion of the flow passage 37 of the top body 22 that is opposite to the other end portion that is connected to the flow passage 71. The circular window 132 penetrating the lower seal member 83 is connected to end portion of the flow passage 52 of the lower body 24 that is opposed to the other end portion that is connected to the pressure control valve 29. The windows 131 and 132 are arranged in the thickness direction of the separation plate 130 so as to coextend with each other.

The deformation portion 133 of the base member 82 that is exposed through the windows 131 and 132 separates the flow passages 52 and 37 located on both sides. The deformation portion 133 is formed with an orifice flow passage 136 that connects the flow passages 52 and 37. The orifice flow passage 136 penetrates through the deformation portion 133 in its thickness direction and is shaped like a cylindrical hole. The orifice flow passage 136 is smaller in cross section than the flow passages 52 and 37. When operating oil flows from the flow passage 52 into the flow passage 37 via the orifice flow passage 136, a pressure difference occurs between the flow passages 52 and 37 and the deformation portion 133 is deformed (strained) in accordance with the pressure difference. Since the pressure difference between the flow passages 52 and 37 varies in proportion to the rate of the outflow from the flow passage 52 to the flow passage 37, it can be considered that the deformation portion 133 is deformed (strained) in accordance with the rate of the outflow from the flow passage 52 to the flow passage 37. The strain of the deformation portion 133 is detected by the strain gauge 32 that is attached to the flow-passage-37-side surface of the deformation portion 133 and is accommodated in the window 131.

The thick portion 134 is a portion, separating the flow passages 52 and 37 located on both sides, of a lamination portion that consists of portions of the top seal member 80 and the wiring member 81 located outside the window 131, a portion of the bottom seal member 83 located outside the window 132, and a portion of the base member 82 located outside the deformation portion 133.

A controller 140 of the fluid circuit module 110 is configured in the same manner as the controller 34 of the first embodiment except for the method for changing the control instruction. The controller 140 calculates a rate of the outflow from the flow passage 52 to the flow passage 37 on the basis of a strain of the deformation portion 133 that is represented by the output signal of the strain gauge 32, and changes the control instruction so that it comes to conform to the calculation result. For example, the controller 140 changes the control instruction when the flow passages 52, 136, 37, 71, 54, 74, and 16 are filled with operating oil in order starting from a state that the flow passages 52 and 37 are empty immediately after turning-on of the ignition switch. The fluid circuit module 110 is configured in such a manner that the rate of the outflow from the flow passage 52 to the flow passage 37 is approximately equal to the flow rate of supply of operating oil to the movable element 12. Therefore, when the above flow passages are filled with operating oil, the rate of the outflow from the flow passage 52 to the flow passage 37 represents the filling statuses indirectly.

In the above-described second embodiment, the bottom body 24 corresponds to the first body, the flow passage 52 corresponds to the first flow passage, the top body 22 corresponds to the second body, the flow passage 37 corresponds to the second flow passage, and the controller 140 corresponds to the control means.

As described above, according to the second embodiment, since the pressure of supply oil is adjusted according to the control instruction that conforms to the rate of the outflow from the flow passage 52 to the flow passage 37, a supply oil control can be realized that reflects the above outflow rate satisfactorily. In particular, when the flow passages are filled with operating oil starting from a state that the flow passages 52 and 37 are empty, a supply oil control is enabled that reflects the filling statuses of the flow passages 52 and 37 because the rate of the outflow from the flow passage 52 to the flow passage 37 represents their filling statuses indirectly. Also in the second embodiment, since such a supply oil control on one movable element 12 can be realized merely by providing one strain gauge 32, the fluid circuit module 110 and the automatic transmission 100 can be miniaturized.

Further, according to the second embodiment, the thin deformation portion 133 that is easily deformed and the thick portion 134 that circumscribes the deformation portion 133 and is not deformed easily are formed in the portion of the separation plate 26 that separates the flow passages 52 and 37 from each other. Therefore, the detection result of the strain gauge 32 is superior in the resolution for the difference between the pressures in the flow passages 52 and 37 and in the resolution for the rate of the outflow from the flow passage 52 to the flow passage 37 which is proportional to the above pressure difference. In the second embodiment, since the pressure in the flow passage 37 that is downstream of the orifice flow passage 136 is lower than the pressure in the flow passage 52 that is upstream of the orifice flow passage 136, the deformation portion 133 is deformed (strained) so as to bulge into the flow passage 37. Therefore, the strain gauge 32 which is attached to the flow-passage-37-side surface of the deformation portion 133 can detect the strain of the deformation portion 133 more easily, whereby increase in detection accuracy is expected. As is understood from the above description, since the controller 140 can calculate, with high accuracy, the rate of the outflow from the flow passage 52 to the flow passage 37 on the basis of the detection result of the strain gauge 32, the operation control for the electromagnetic valve 28 based on the calculation result and the supply oil control can be made more accurate.

Still further, according to the second embodiment, the deformation portion 133 and the thick portion 134 can be formed easily at the same time as the members 80-83 of the separation plate 130 are laid one on another, according to the same principle as the deformation portion 88 and the thick portion 89 of the first embodiment are formed. Furthermore, because of the employment of the thick portion 134 that is not deformed easily, the performance of sealing between the bottom seal member 83 and the bottom body 24 and that between the top seal member 80 and the top body 22 can be kept high outside the windows 131 and 132.

Third Embodiment

Figure 10:
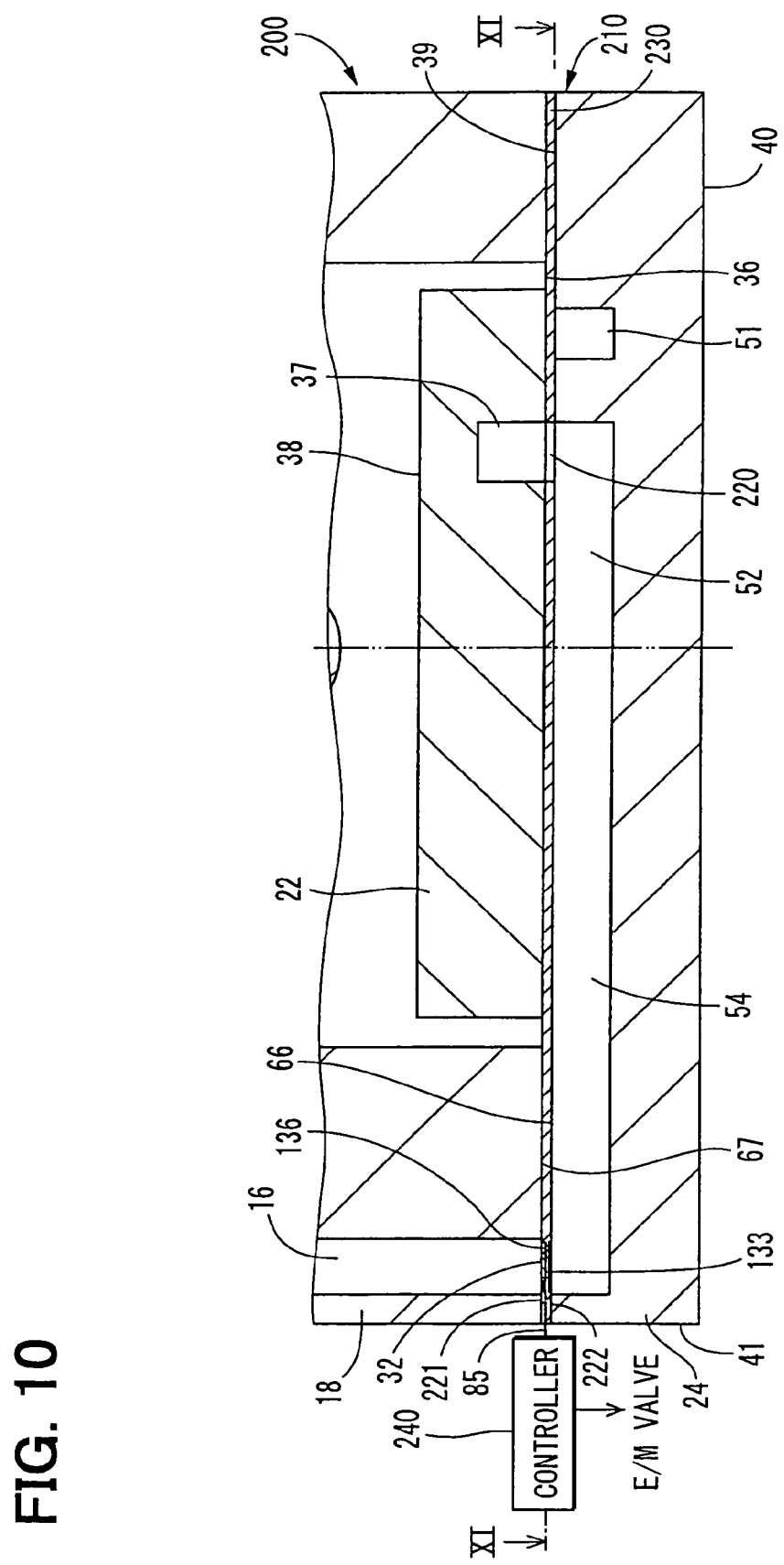
FIG. 10 is a sectional view, taken along line X-X in FIG. 11, of an automatic transmission according to a third embodiment.
Figure 11:
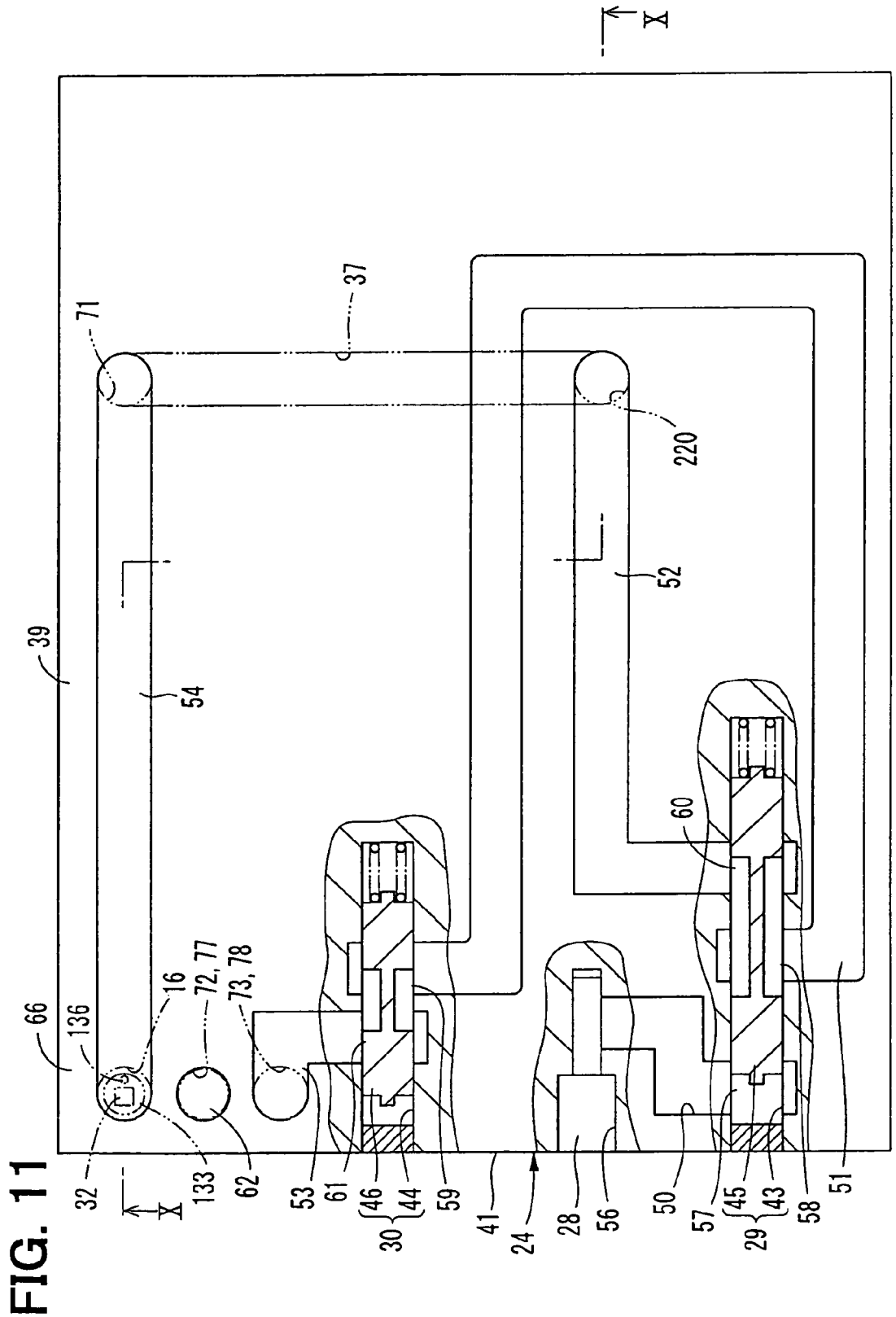
FIG. 11 is a sectional view, taken along line XI-XI in FIG. 10, of a fluid circuit module of the automatic transmission according to the third embodiment.
Figure 12:
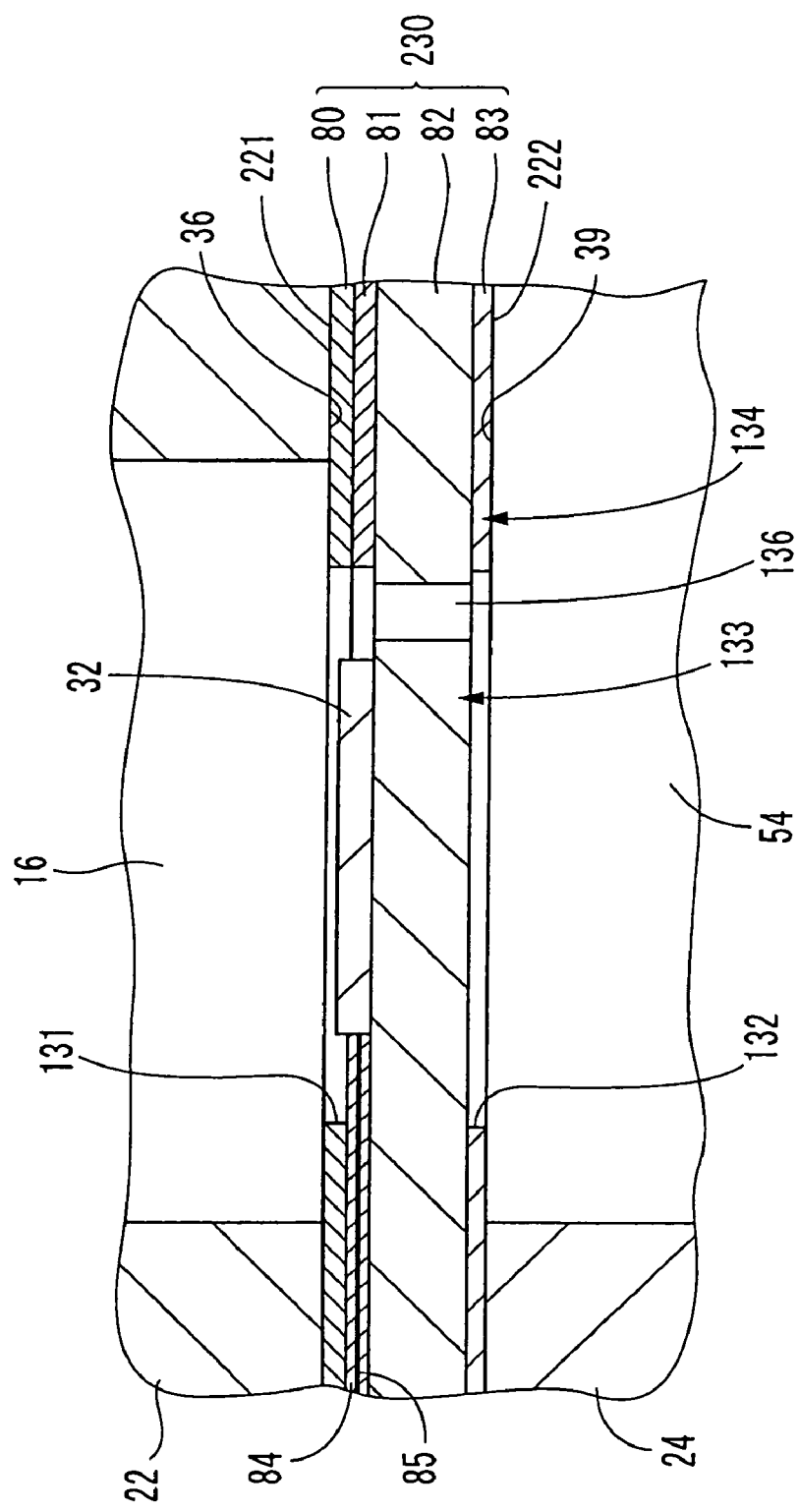
FIG. 12 is an enlarged sectional view of an important part of the fluid circuit module of the automatic transmission according to the third embodiment.

A third embodiment of the invention is a modification of the second embodiment. FIGS. 10-12 show an automatic transmission 200 according to the third embodiment. Components of the third embodiment having substantially the same components in the second embodiment will be given the same reference symbols as the latter and will not be described.

In a fluid circuit module 210 of the automatic transmission 200, a separation plate 230 is not formed with the flow passage 74 and, instead, the fluid circuit module 210 is formed with a flow passage 220 that penetrates through the separation plate 230 in its thickness direction between end surfaces 221 and 222. And the windows 131 and 132 are connected to objects different from those in the second embodiment.

More specifically, the flow passage 220 connects the flow passage 37 of the top body 22 and the flow passage 52 of the bottom body 24.

The window 131 is connected to the end portion of the flow passage 16 of the case 18 that is opposite to the other end portion that is connected to the movable element 12. The window 132 is connected to the end portion of the flow passage 54 of the bottom body 24 that is opposite to the other end portion that is connected to the flow passage 71. As a result, the deformation portion 133 that is exposed through the windows 131 and 132 separates the flow passages 54 and 16 located on both sides together with the thick portion 134 located outside the deformation portion 133. The orifice flow passage 136 of the deformation portion 133 connects the flow passages 54 and 16. Therefore, when operating oil flows from the flow passage 54 into the flow passage 16 via the orifice flow passage 136, a pressure difference occurs between the flow passages 54 and 16 and the deformation portion 133 is deformed (strained) in accordance with the pressure difference. Since the pressure difference between the flow passages 54 and 16 varies in proportion to the rate of the outflow from the flow passage 54 to the flow passage 16, it can be considered that the deformation portion 133 is deformed (strained) in accordance with the rate of the outflow from the flow passage 54 to the flow passage 16. The strain of the deformation portion 133 is detected by the strain gauge 32 that is attached to the flow-passage-16-side surface of the deformation portion 133 and is accommodated in the window 131.

A controller 240 of the fluid circuit module 210 is configured in the same manner as the controller 140 of the second embodiment except that the physical quantity that is calculated in changing the control instruction is the rate of the outflow from the flow passage 54 to the flow passage 16. For example, the controller 240 changes the control instruction when the flow passages 52, 220, 37, 71, 54, 136, and 16 are filled with operating oil in order starting from a state that the flow passages 54 and 16 are empty immediately after turning-on of the ignition switch.

In the above-described third embodiment, the bottom body 24 corresponds to the module body, the flow passage 54 of the bottom body 24 corresponds to the module flow passage, the flow passage 16 of the case 18 corresponds to the case flow passage, and the controller 240 corresponds to the control means.

As described above, according to the third embodiment, since the pressure of supply oil is adjusted according to the control instruction that conforms to the rate of the outflow from the flow passage 54 to the flow passage 16, a supply oil control can be realized that reflects the above outflow rate satisfactorily. When the flow passages are filled with operating oil starting from a state that the flow passages 54 and 16 are empty, a supply oil control is enabled that reflects the filling state of the flow passages 54 and 16 according to the same principle as in the second embodiment. Also in the third embodiment, since such a supply oil control on one movable element 12 can be realized merely by providing one strain gauge 32, the fluid circuit module 210 and the automatic transmission 200 can be miniaturized.

Further, according to the third embodiment, the detection result of the strain gauge 32 is superior in the resolution for the rate of the outflow from the flow passage 54 to the flow passage 16 according to the same principle as in the second embodiment. In the third embodiment, since the pressure in the flow passage 16 that is downstream of the orifice flow passage 136 is lower than the pressure in the flow passage 54 that is upstream of the orifice flow passage 136, the deformation portion 133 is deformed (strained) so as to bulge into the flow passage 16. Therefore, the strain gauge 32 which is attached to the flow-passage-16-side surface of the deformation portion 133 can detect the strain of the deformation portion 133 more easily, whereby increase in detection accuracy is expected. As is understood from the above description, since the controller 240 can calculate, with high accuracy, the rate of the outflow from the flow passage 54 to the flow passage 16 on the basis of the detection result of the strain gauge 32, the operation control for the electromagnetic valve 28 based on the calculation result and the supply oil control can be made more accurate.

Fourth Embodiment

Figure 13:
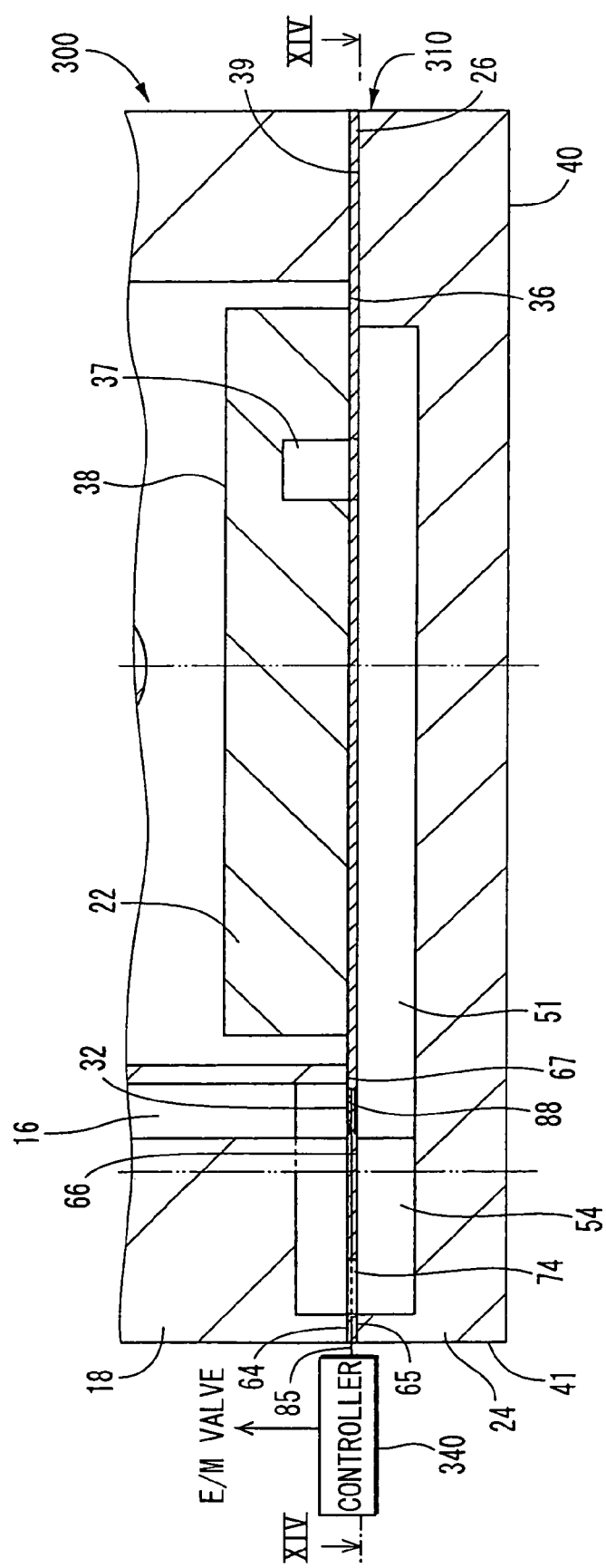
FIG. 13 is a sectional view, taken along line XIII-XIII in FIG. 14, of an automatic transmission according to a fourth embodiment.
Figure 14:
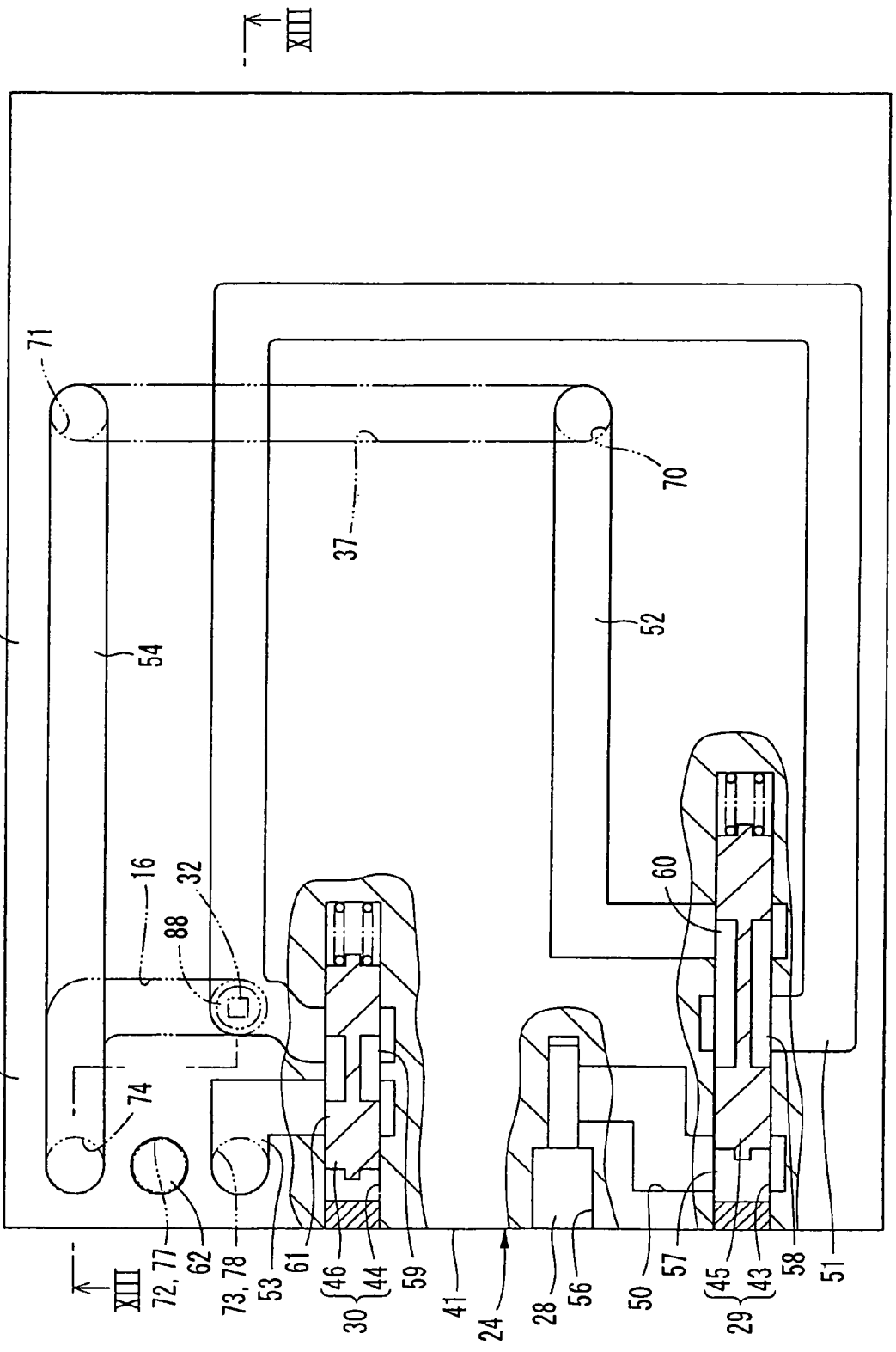
FIG. 14 is a sectional view, taken along line XIV-XIV in FIG. 13, of a fluid circuit module of the automatic transmission according to the fourth embodiment.
Figure 15:
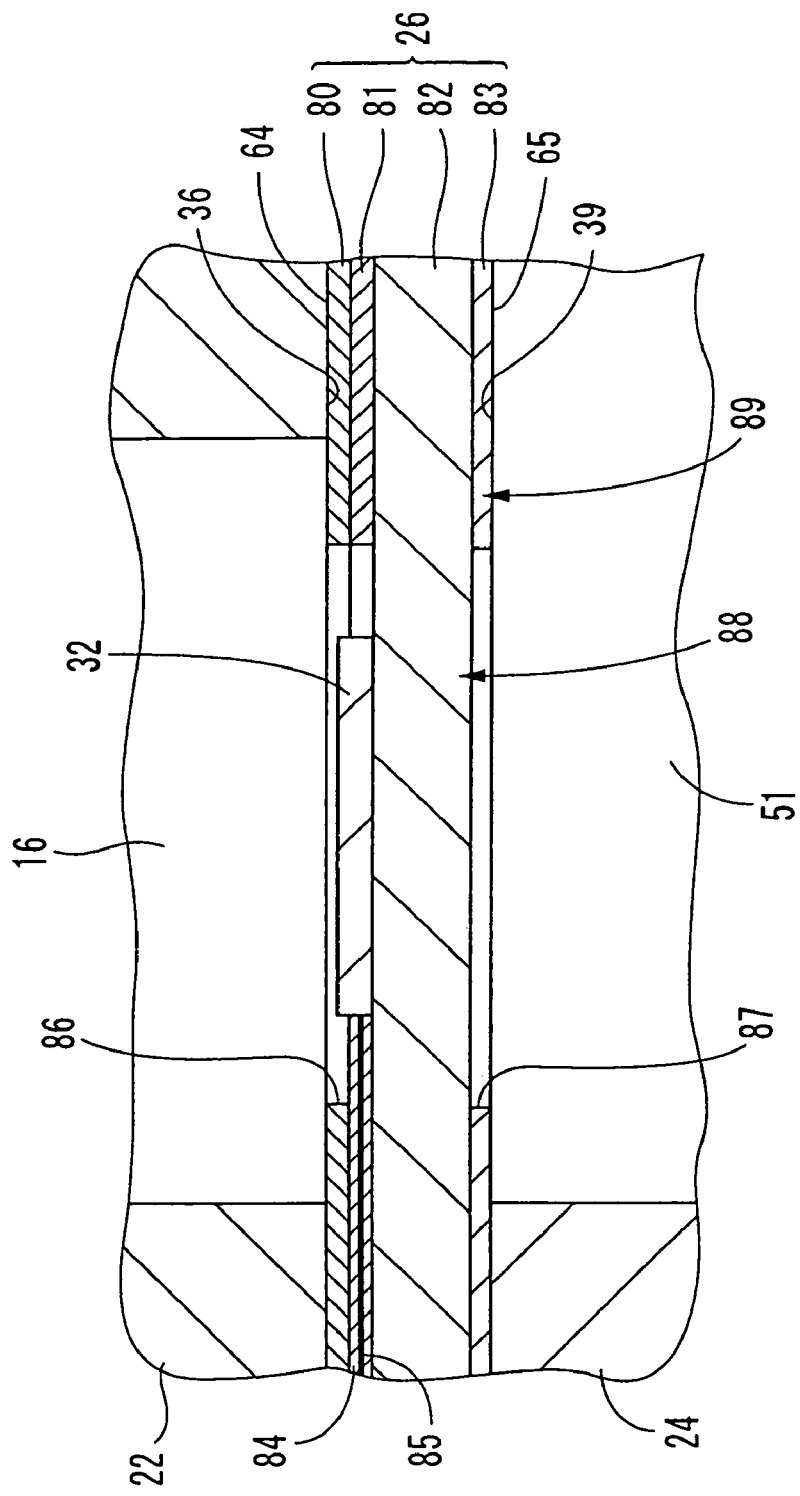
FIG. 15 is an enlarged sectional view of an important part of the fluid circuit module of the automatic transmission according to the fourth embodiment.

A fourth embodiment of the invention is a modification of the first embodiment. FIGS. 13-15 show an automatic transmission 300 according to the fourth embodiment. Components of the third embodiment having substantially the same components in the first embodiment will be given the same reference symbols as the latter and will not be described.

In a fluid circuit module 310 of the automatic transmission 300, the windows 86 and 87 are located at a different position than in the first embodiment.

More specifically, the windows 86 and 87 that are arranged in the thickness direction of the separation plate 26 so as to coextend with each other are formed between the flow passage 16 of the case 18 and the flow passage 51 of the bottom body 24 that are arranged in the thickness direction of the bottom body 24 and overlap with each other so as to assume a generally L-shaped form. As a result, the deformation portion 88 that is exposed by the windows 86 and 87 separates the flow passages 16 and 51 together with the thick portion 89 that is located outside the deformation portion 88. Therefore, the strain gauge 32 that is attached to the flow-passage-16-side surface of the deformation portion 88 and is accommodated in the window 86 detects a strain of the deformation portion 88 that conforms to the difference between pressures in the flow passages 16 and 51.

A controller 340 of the fluid circuit module 310 is configured in the same manner as the controller 34 of the first embodiment except that the physical quantity that is calculated in changing the control instruction is the difference between the pressures in the flow passages 16 and 51.

In the above-described fourth embodiment, the bottom body 24 corresponds to the module body, the flow passage 51 of the bottom body 24 corresponds to the module flow passage, the flow passage 16 of the case 18 corresponds to the case flow passage, and the controller 340 corresponds to the control means.

As described above, according to the fourth embodiment, since the pressure of supply oil is adjusted according to the control instruction that conforms to the difference between the supply pressure in the flow passage 16 and the line pressure in the flow passage 51, a supply oil control can be realized that reflects the above pressure difference satisfactorily. Also in the fourth embodiment, since such a supply oil control on one movable element 12 can be realized merely by providing one strain gauge 32, not only the size of the fluid circuit module 210 but also the size of the automatic transmission 300 can be reduced.

Further, according to the fourth embodiment, the detection result of the strain gauge 32 is superior in the resolution for the difference between the pressures in the flow passages 16 and 51 according to the same principle as in the first embodiment. In the fourth embodiment, the deformation portion 88 is deformed (strained) so as to bulge into the flow passage 16 having the supply pressure that is lower than the line pressure in the flow passage 51. Therefore, the strain gauge 32 which is attached to the flow-passage-16-side surface of the deformation portion 88 can detect the strain of the deformation portion 88 more easily and hence its detection accuracy is increased. As is understood from the above description, since the controller 340 can calculate, with high accuracy, the difference between the pressures in the flow passages 16 and 51 on the basis of the detection result of the strain gauge 32, the operation control for the electromagnetic valve 28 based on the calculation result and the supply oil control can be made more accurate.

Although the plural embodiments of the invention have been described above, the invention should not be construed as being limited to those embodiments.

For example, in the first to fourth embodiments, the strain gauge 32 may be disposed on the flow passage 51, 52, or 54 side of the deformation portion 88 or 133. In this case, the wiring member 81 is set between the base member 82 and the bottom seal member 83. As a further alternative, in the first to fourth embodiments, the strain gauge 32 may be disposed on both sides of the deformation portion 88 or 133. In this case, the wiring member 81 is set between the base member 82 and the top seal member 80 and between the base member 82 and the bottom seal member 83. In either case, the number of strain gauges 32 that are attached to the deformation portion 88 or 133 may be set as appropriate.

In the first to fourth embodiments, a known sensor other than the strain gauge 32 and capable of detecting the strain of the deformation portion 88 or 133 may be attached to the deformation portion 88 or 133 as the strain sensor.

In the first to fourth embodiments, the separation plate 26, 130, or 230 may be a single member that is formed with the windows 86 and 87 or 131 and 132, the deformation portion 88 or 133, and the thick portion 89 or 134. In the first to fourth embodiments, a structure is possible in which the separation plate 130 is not formed with the windows 86 and 87 or 131 and 132. That is, the portion that separates the flow passages 37 and 51, the flow passages 52 and 37, the flow passages 54 and 16, or the flow passages 16 and 51 may serve as a deformation portion 88 or 133 having the same thickness as the other portions.

Further, in the first to fourth embodiments, the electromagnetic valve 28 may directly adjust the pressure of supply oil to be supplied to the movable element 12, in which case the electromagnetic valve 28 solely constitutes the pressure regulating valve means.

Still further, each of the first to fourth embodiments may be combined with a feature of another embodiment.

In addition, the second embodiment may be modified in such a manner that another window, deformation portion, and thick portion that are separate from the window 132, the deformation portion 133, and the thick portion 134 are formed in the separation plate 130 at the portion where the flow passage 71 is formed, and that another strain gauge that is separate from the strain gauge 32 is attached to the separate deformation portion. In the second and third embodiment, plural orifice flow passages 136 may be formed through the deformation portion 133.

What is claimed is:

1. A fluid circuit module for controlling a fluid to be supplied to a movable element in an automatic transmission, comprising:
   a first body in which a first flow passage is formed;
   a second body in which a second flow passage is formed;
   a separation plate that is set between the first body and the second body and has a deformation portion that is deformed and strained in accordance with a difference between pressures in the first flow passage and the second flow passage;
   a strain sensor attached to the deformation portion, for detecting a strain of the deformation portion; and
   control means for controlling a supply fluid to be supplied to the movable element on the basis of a detection result of the strain sensor,
   wherein the deformation portion directly confronts the first flow passage and the second flow passage.

2. The fluid circuit module according to claim 1, wherein the strain sensor is disposed on one of a first flow passage side and a second flow passage side of the deformation portion to which the deformation portion bulges.

3. The fluid circuit module according to claim 1, wherein the strain sensor is a strain gauge.

4. The fluid circuit module according to claim 1, wherein the first flow passage and the second flow passage do not communicate with each other; and
   the control means calculates the pressure difference on the basis of the detection result of the strain sensor and controls the supply fluid in accordance with a calculation result.

5. The fluid circuit module according to claim 4, further comprising:
   pressure regulating valve means for adjusting a pressure of the supply fluid according to a control instruction from the control means, wherein
   a fluid having a line pressure that is an original pressure of the pressure regulating valve means flows through the first flow passage;
   the supply fluid of which pressure has been adjusted by the pressure regulating valve means flows through the second flow passage; and
   the control means changes the control instruction in accordance with the calculation result.

6. The fluid circuit module according to claim 5, wherein the pressure regulating valve means is held by at least one of the first body and the second body.

7. The fluid circuit module according to claim 1, wherein the deformation portion is formed with an orifice flow passage that communicates with the first flow passage and the second flow passage; and
   the control means calculates a rate of an outflow from the first flow passage to the second flow passage on the basis of the detection result of the strain sensor, and controls the supply fluid in accordance with a calculation result.

8. The fluid circuit module according to claim 7, further comprising
   pressure regulating valve means for adjusting a pressure of the supply fluid according to a control instruction from the control means, wherein
   the supply fluid of which pressure has been adjusted by the pressure regulating valve means flows through the first flow passage; and the control means changes the control instruction in accordance with the calculation result.

9. The fluid circuit module according to claim 1, wherein the separation plate has a thick portion that is thicker than the deformation portion and is located outside the deformation portion, and the deformation portion and the thick portion together separate the first flow passage and the second flow passage from each other.

10. A fluid circuit module for controlling a fluid to be supplied to a movable element in an automatic transmission, comprising:
   a first body in which a first flow passage is formed;
   a second body in which a second flow passage is formed;
   a separation plate that is set between the first body and the second body and has a deformation portion that is deformed and strained in accordance with a difference between pressures in the first flow passage and the second flow passage;
   a strain sensor attached to the deformation portion, for detecting a strain of the deformation portion; and
   control means for controlling a supply fluid to be supplied to the movable element on the basis of a detection result of the strain sensor, wherein
   the separation plate has a thick portion that is thicker than the deformation portion and is located outside the deformation portion, and the deformation portion and the thick portion together separate the first flow passage and the second flow passage from each other;
   the separation plate is a combination of a base member and a seal member that is laid on the base member and seals a space between the base member and at least one of the first body and the second body;
   the seal member has a window through which the base member is exposed partially;
   the deformation portion is an exposed portion of the base member that is exposed through the window; and
   the thick portion is a lamination portion formed by a portion of the base member that is located outside the exposed portion and a portion of the seal member that is located outside the window.

11. The flow circuit module according to claim 10, further comprising
   a signal line for transmitting a signal representing the detection result from the strain sensor to the control means, wherein
   the signal line is set between the base member and the seal member.

12. An automatic transmission comprising:
   a movable element;
   a first body in which a first flow passage is formed;
   a second body in which a second flow passage is formed;
   a separation plate that is set between the first body and the second body and has a deformation portion that is deformed and strained in accordance with a difference between pressures in the first flow passage and the second flow passage;
   a strain sensor attached to the deformation portion, for detecting a strain of the deformation portion; and
   control means for controlling a supply fluid to be supplied to the movable element on the basis of a detection result of the strain sensor,
   wherein the deformation portion directly confronts the first flow passage and the second flow passage.

13. The automatic transmission according to claim 12, wherein the automatic transmission is a stepless transmission in which the movable element is driven by the supply fluid and a transmission gear ratio is thereby changed continuously.

14. The automatic transmission according to claim 12, wherein the automatic transmission is a stepped transmission in which the movable element is driven by the supply fluid and a transmission gear ratio is thereby changed stepwise.

15. A fluid circuit module for controlling a fluid to be supplied to a movable element via a case flow passage in an automatic transmission in which the case flow passage is formed in a case that houses the movable element, comprising:
   a module body in which a module flow passage is formed;
   a separation plate that is set between the module body and the case and has a deformation portion that is deformed and strained in accordance with a difference between pressures in the module flow passage and the case flow passage;
   a strain sensor attached to the deformation portion, for detecting a strain of the deformation portion; and
   control means for controlling a supply fluid to be supplied to the movable element on the basis of a detection result of the strain sensor,
   wherein the deformation passage directly confronts the module flow passage and the case flow passage.

16. The fluid circuit module according to claim 15, wherein the strain sensor is disposed on one of a module flow passage side and a case flow passage side of the deformation portion to which the deformation portion bulges.

17. The fluid circuit module according to claim 15, wherein the strain sensor is a strain gauge.

18. The fluid circuit module according to claim 15, wherein
   the module flow passage and the case flow passage do not communicate with each other; and
   the control means calculates a pressure difference between pressures in the module flow passage and the case flow passage on the basis of the detection result of the strain sensor and controls the supply fluid in accordance with a calculation result.

19. The fluid circuit module according to claim 18, further comprising
   pressure regulating valve means for adjusting a pressure of the supply fluid according to a control instruction from the control means, wherein
   a fluid having a line pressure that is an original pressure of the pressure regulating valve means flows through the module flow passage; and,
   the control means changes the control instruction in accordance with the calculation result.

20. The fluid circuit module according to claim 19, wherein the pressure regulating valve means is held by the module body.

21. The fluid circuit module according to claim 15, wherein
   the deformation portion is formed with an orifice flow passage that connects the module flow passage to the case flow passage; and
   the control means calculates a rate of an outflow from the module flow passage to the case flow passage on the basis of the detection result of the strain sensor, and controls the supply fluid in accordance with a calculation result.

22. The fluid circuit module according to claim 21, further comprising
   pressure regulating valve means for adjusting a pressure of the supply fluid according to a control instruction from the control means, wherein the supply fluid whose pressure has been adjusted by the pressure regulating valve means flows through the module flow passage; and the control means changes the control instruction in accordance with the calculation result.

23. The fluid circuit module according to claim 15, wherein the separation plate has a thick portion that is thicker than the deformation portion and is located outside the deformation portion, and the deformation portion and the thick portion together separate the module flow passage and the case flow passage from each other.

24. A fluid circuit module for controlling a fluid to be supplied to a movable element via a case flow passage in an automatic transmission in which the case flow passage is formed in a case that houses the movable element, comprising:

a module body in which a module flow passage is formed;

a separation plate that is set between the module body and the case and has a deformation portion that is deformed and strained in accordance with a difference between pressures in the module flow passage and the case flow passage;

a strain sensor attached to the deformation portion, for detecting a strain of the deformation portion; and control means for controlling a supply fluid to be supplied to the movable element on the basis of a detection result of the strain sensor, wherein the separation plate has a thick portion that is thicker than the deformation portion and is located outside the deformation portion, and the deformation portion and the thick portion together separate the module flow passage and the case flow passage from each other;

the separation plate is a combination of a base member and a seal member that is laid on the base member and seals a space between the base member and at least one of the module body and the case;

the seal member has a window through which the base member is exposed partially;

the deformation portion is an exposed portion of the base member that is exposed through the window; and the thick portion is a lamination portion formed by a portion of the base member that is located outside the exposed portion and a portion of the seal member that is located outside the window.

25. The flow circuit module according to claim 24, further comprising a signal line for transmitting a signal representing the detection result from the strain sensor to the control means, wherein the signal line is set between the base member and the seal member.

26. An automatic transmission comprising:

a movable element;

a case that houses the movable element and in which a case flow passage is formed;

a module body in which a module flow passage is formed;

a separation plate that is set between the module body and the case and has a deformation portion that is deformed and strained in accordance with a difference between pressures in the module flow passage and the case flow passage;

a strain sensor attached to the deformation portion, for detecting a strain of the deformation portion; and control means for controlling a supply fluid to be supplied to the movable element on the basis of a detection result of the strain sensors wherein the deformation passage directly confronts the module flow passage and the case flow passage.

* * * * *